US012686301B2

(12) United States Patent
Yu et al.

(10) Patent No.: US 12,686,301 B2
(45) Date of Patent: Jul. 21, 2026

(54) HEAD PROTECTION DEVICE AND CARRIER

(71) Applicant: WONDERLAND SWITZERLAND AG, Steinhausen (CH)

(72) Inventors: Xiong Yu, Dongguan (CN); Qiang Yang, Dongguan (CN); Bo Wu, Dongguan (CN); Meifeng Fan, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 151 days.

(21) Appl. No.: 18/396,392

(22) Filed: Dec. 26, 2023

(65) Prior Publication Data

US 2024/0208375 A1 Jun. 27, 2024

(30) Foreign Application Priority Data

Dec. 27, 2022 (CN) .......................... 202211688160.0
Sep. 11, 2023 (CN) .......................... 202311171265.3

(51) Int. Cl.
*B60N 2/28* (2006.01)
*B60N 2/26* (2006.01)
*B60R 22/00* (2006.01)

(52) U.S. Cl.
CPC ........... *B60N 2/2818* (2023.08); *B60N 2/265* (2013.01); *B60N 2/2812* (2013.01);
(Continued)

(58) Field of Classification Search
CPC .. B60N 2/2812; B60N 2/2818; B60N 2/2851; B60N 2/265; B60R 2022/006
See application file for complete search history.

(56) References Cited

U.S. PATENT DOCUMENTS 5,839,793 A * 11/1998 Merrick ................. B60N 2/286
297/482 X
6,457,774 B2 * 10/2002 Baloga ................... B60N 2/286
297/482 X
(Continued)

FOREIGN PATENT DOCUMENTS

CN 102085819 B 11/2015
CN 211154783 U 8/2020
(Continued)

OTHER PUBLICATIONS

First Office Action in Corresponding Taiwan Application No. 112150823, dated Sep. 23, 2024; 16 pgs.

*Primary Examiner* — Rodney B White
(74) *Attorney, Agent, or Firm* — HAUPTMAN HAM, LLP

(57) ABSTRACT

A head protection device for wrapping a shoulder belt and a length adjustment device of a carrier, the shoulder belt connected to a backrest and a seat of the carrier, and the shoulder belt wound around the length adjustment device, the length adjustment device slideable relative to the shoulder belt along a length extension direction of the shoulder belt. The head protection device includes a protection sheet, including a first part located between the length adjustment device and the backrest, and a limiting structure, arranged on the first part, wherein, the shoulder belt passes through the protection sheet twice in opposite directions at at least one position on the first part through the limiting structure, and the protection sheet is slidable relative to the shoulder belt along a length extension direction of the shoulder belt, the length adjustment device synchronously slides with the protection sheet on the shoulder belt.

20 Claims, 12 Drawing Sheets

(52) U.S. Cl.
CPC ........ *B60N 2/2851* (2013.01); *B60N 2205/30* (2013.01); *B60R 2022/006* (2013.01)

(56) References Cited

U.S. PATENT DOCUMENTS

| | | | | |
|---|---|---|---|---|
| 6,471,298 | B2 * | 10/2002 | Carine | B60N 2/2812 297/482 X |
| 6,863,350 | B1 * | 3/2005 | McCulley | B60N 2/2812 297/219.12 |
| 7,350,862 | B2 * | 4/2008 | Fransen | B60N 2/2812 297/482 X |
| 7,506,929 | B2 * | 3/2009 | Fransen | B60N 2/2812 297/482 X |
| 8,550,567 | B2 * | 10/2013 | Biaud | B60N 2/2851 297/484 |
| 8,777,322 | B2 * | 7/2014 | Horton | B60N 2/2851 297/484 |
| 9,610,866 | B2 * | 4/2017 | Mitsuo | B60N 2/2816 |
| 9,840,225 | B2 * | 12/2017 | Cobb | A44B 11/2557 |
| 10,457,246 | B2 * | 10/2019 | Coakley | B60N 2/2812 |
| 10,640,018 | B2 * | 5/2020 | Coakley | B60N 2/2812 |
| 11,839,314 | B2 * | 12/2023 | Wu | B62B 9/102 |
| 12,005,952 | B2 * | 6/2024 | Liu | B62B 9/24 |
| 12,178,330 | B2 * | 12/2024 | Wu | B62B 9/104 |
| 2006/0006710 | A1 * | 1/2006 | Sallus | B60N 2/60 297/219.12 |
| 2011/0156469 | A1 * | 6/2011 | Carpenter | B60R 22/105 297/482 |
| 2011/0227392 | A1 * | 9/2011 | Morrissey | B60N 2/2816 297/482 |
| 2017/0106789 | A1 * | 4/2017 | Holbrook-Smith | B60Q 9/00 |
| 2020/0269807 | A1 * | 8/2020 | Tardif | B60N 2/272 |
| 2024/0336292 | A1 * | 10/2024 | Gervasi | B62B 9/24 |
| 2025/0222971 | A1 * | 7/2025 | Guo | A47D 15/005 |

FOREIGN PATENT DOCUMENTS

| | | | | |
|---|---|---|---|---|
| CN | 113492793 | A | 10/2021 | |
| CN | 217099751 | U | 8/2022 | |
| CN | 116001901 | A | 4/2023 | |
| EP | 3345784 | A1 * | 7/2018 | ......... B60N 2/2851 |
| TW | 202227306 | A | 7/2022 | |

* cited by examiner

<u>100</u>

200

HEAD PROTECTION DEVICE AND CARRIER

CROSS-REFERENCE TO RELATED APPLICATIONS

This application claims priority to Chinese Application No. 202211688160.0, filed on Dec. 27, 2022, entitled "HEAD PROTECTION DEVICE AND CARRIER", and Chinese Application No. 202311171265.3, filed on Sep. 11, 2023, entitled "HEAD PROTECTION DEVICE AND CARRIER", which are incorporated herein by reference in its entirety.

TECHNICAL FIELD

The present application relates to a head protection device and a carrier comprising the head protection device.

BACKGROUND

For parents with children at home, they usually use baby carriers such as strollers, baby baskets, and safety seats to replace hand holding when carrying their children out, in order to reduce the burden on adults. Moreover, the baby carrier has the advantages of comfortable and safe riding, making it increasingly popular among people. For safety reasons, existing baby carriers are often equipped with shoulder belts and waist belts that fix the baby. The length of the shoulder belts is generally set to be adjustable, mostly through buckles installed on the shoulder belts to adjust the length of the shoulder belts. Wherein, in order to improve the comfort and safety of use, there is also a protection sheet for wrapping the buckle on the shoulder belt to protect the head and neck of the baby.

However, most of the existing protection sheets are only installed on the shoulder belt. During the riding process or in the process of adjusting the length of the shoulder belt, the protection sheets may be misaligned due to movement relative to the buckle or shoulder belt, causing the buckle to be exposed to the outside of the protection sheet, or making the shoulder belt directly contact the head and neck of the baby, thereby reducing the comfort of use, and even causing injuries to the head and neck of the baby due to collision or friction with the buckle or shoulder belt, which cannot provide good protection.

Therefore, a simple, user-friendly, and safe and reliable head protection device and a carrier with the head protection device are needed to overcome the above-mentioned problems, even when adjusting the height of the protection sheet without relative sliding with the buckle, and to overcome the slip defect of the protection sheet relative to the shoulder belt due to its own gravity.

SUMMARY

The present disclosure provides a head protection device for wrapping a shoulder belt of a carrier and a length adjustment device of the carrier, wherein the shoulder belt is directly or indirectly connected to a backrest of the carrier and a seat of the carrier, and the shoulder belt is wound around the length adjustment device, the length adjustment device is slidable relative to the shoulder belt along a length extension direction of the shoulder belt, wherein the head protection device comprises: a protection sheet, including a first part located between the length adjustment device and the backrest; and a limiting structure, which is arranged on the first part; wherein the shoulder belt passes through the protection sheet twice in opposite directions at at least one position on the first part through the limiting structure, and the protection sheet is slidable relative to the shoulder belt along the length extension direction of the shoulder belt, and the length adjustment device synchronously slides with the protection sheet on the shoulder belt.

In an embodiment, the shoulder belt comprises a first belt comprising an upper connecting end connected to the backrest and a lower connecting end connected to the backrest at a position different from the position of the upper connecting end, the first belt passes through the protection sheet twice in opposite directions at at least two positions on the first part through the limiting structure, and the protection sheet slides relative to the first belt between the upper connecting end and the lower connecting end to adjust the position of the protection sheet on the first belt.

In an embodiment, the limiting structure comprises a first slot and a second slot set at an interval, the first belt passes through the protection sheet through the first slot and the second slot in opposite directions respectively, and the first slot and the second slot each has continuously extending periphery edges.

In an embodiment, the limiting structure is a limiting member embedded in the protection sheet, the first slot is a first hole of the limiting member, and the second slot is a second hole of the limiting member.

In an embodiment, the first slot and the second slot are two openings provided on the protection sheet.

In an embodiment, each of the first slot and the second slot is sized to prevent the length adjustment device from passing through.

In an embodiment, in the length extension direction of the first belt, each of the first slot and the second slot is sized smaller than the length adjustment device.

In an embodiment, in the width extension direction of the first belt, each of the first slot and the second slot is sized greater than or equal to the first belt, and each of the first slot and the second slot is sized smaller than the length adjustment device.

In an embodiment, a size of the length adjustment device in a thickness extension direction of the first belt is greater than a size of any one of the first slot and the second slot in the length extension direction of the first belt.

In an embodiment, a distance between the first slot and the second slot in the length extension direction of the first belt is smaller than a size of the length adjustment device.

In an embodiment, the protection sheet comprises a second part located on the side of the length adjustment device facing away from the first part, the protection sheet is provided with a folding line between the first part and the second part, and the folding line extends along the length extension direction of the first belt.

In an embodiment, the first belt is wound around the length adjustment device, the length adjustment device synchronously slides with the protection sheet between the upper connecting end and the lower connecting end, and the first belt and limiting structure maintains a relative position between the length adjustment device and the protection sheet.

In an embodiment, the first belt comprises an upper part and a lower part each located between the upper connecting end and the lower connecting end, the upper part extends from a side of the first part facing the backrest through the first slot to a side of the first part facing away from the backrest, and extends from a side of the length adjustment device facing the first part through the length adjustment device to a side of the length adjustment device facing away from the first part, the lower part extends from the side of the length adjustment device facing away from the first part through the length adjustment device to the side of the length adjustment device facing the first part, and extends from the side of the first part facing away from the backrest through the second slot to the side of the first part facing the backrest.

In an embodiment, the shoulder belt further includes a second belt, the second belt includes a connecting end and a free end, the connecting end is directly or indirectly connected to the seat, and the second belt is wound around the length adjustment device, the length adjustment device slides relative to the second belt between the connecting end and the free end, so as to adjust an extension length of the second belt between the connecting end and the length adjustment device.

In an embodiment, the second belt further comprises a connecting part and an adjusting part each located between the connecting end and the free end, the connecting part is connected from the connecting end to the length adjusting device, the adjusting part extends from the length adjustment device to the free end, and the length adjustment device slides along the second belt to distribute lengths of the adjusting part and the connecting part.

In an embodiment, the length adjustment device is provided with a first column and a second column both for winding the shoulder belt, and a through gap between the first column and the second column, wherein the first belt is wound on the first column, the second belt is wound on the second column, and both the first belt and the second belt pass through the through gap.

In an embodiment, the shoulder belt further includes a second belt comprising a connecting end and a free end, the connecting end is connected to the first part, and the second belt is wound around the length adjustment device and passes through a connecting buckle of the seat, the length adjustment device and the connecting buckle slide relative to the second belt between the connecting end and the free end to adjust the extension length of the second belt between the connecting end and the connecting buckle.

In an embodiment, the second belt further comprises a connecting part and an adjusting part each located between the connecting end and the free end, the connecting part extends from the side of the length adjustment device facing the first part through the length adjustment device to the side of the length adjustment device facing away from the first part, the adjusting part extends from the side of the length adjustment device facing away from the first part through the length adjustment device to the side of the length adjustment device facing the first part, and passes through the connecting buckle, and extends again from the side of the length adjustment device facing the first part through the length adjustment device to the side of the length adjustment device facing away from the first part, and then extends from the side of the length adjustment device facing away from the first part through the length adjustment device to the side of the length adjustment device facing the first part, the length adjustment device and the connecting buckle slide on the second belt to distribute lengths of the adjusting part and the connecting part.

In an embodiment, the length adjustment device is provided with a lateral column for winding the second belt.

In an embodiment, the shoulder belt comprises a first belt, the first belt comprises an upper connecting end connected to the backrest and a lower connecting end connected to the backrest at a position different from the position of the upper connecting end, the first belt passes through the protection sheet twice in opposite directions through the limiting structure at one position on the protection sheet and is wound around the length adjustment device, the length adjustment device synchronously slides with the sliding of the protection sheet between the upper connecting end and the lower connecting end.

In an embodiment, the limiting structure is a first slot, and the first slot has continuously extending periphery edges.

In an embodiment, the first slot is sized smaller than the length adjustment device in the length extension direction of the first belt.

In an embodiment, the first slot is set to allow the length adjustment device to pass through after rotation.

In an embodiment, the first slot is sized greater than the length adjustment device in the width extension direction of the first belt.

In an embodiment, a size of the length adjustment device in the thickness extension direction of the first belt is smaller than a size of the first slot in the length extension direction of the first belt.

In an embodiment, the first belt extends from the side of the first part facing the backrest through the first slot and the length adjustment device to the side of the length adjustment device facing away from the first part, then extends from the side of the length adjustment device facing away from the first part through the length adjustment device and the first slot back to the side of the first part facing the backrest, the length adjustment device synchronously slides with the sliding of the protection sheet on the first belt, the first belt maintains a relative position between the length adjustment device and the protection sheet.

In an embodiment, the shoulder belt further comprises a second belt wound around the length adjustment device, the second belt comprises a connecting part and an adjusting part, the head protection device further comprises a positioning belt, the positioning belt is arranged on the side of the first part facing away from the backrest, a gap is formed between the positioning belt and the first part, and both the connecting part and the adjusting part pass through the gap, and the connecting part and the adjusting part overlap with each other in the gap, the length adjustment device includes an edge part, the edge part is located on the side of the positioning belt facing away from the first part and abuts against the positioning belt.

In an embodiment, the second belt comprises a connecting end and a free end, the connecting part and the adjusting part are located between the connecting end and the free end, the connecting end is directly or indirectly connected to the seat, the length adjustment device slides relative to the second belt between the connecting end and the free end to adjust a extension length of the second belt between the connecting end and the length adjustment device.

In an embodiment, the material of the positioning belt is elastic material.

The present disclosure further provides a carrier, wherein the carrier comprises: a seat; a backrest connected to the seat; two shoulder belts connected between the seat and the backrest, and the shoulder belt is detachably directly or indirectly connected to the seat; two length adjustment devices arranged on two shoulder belts separately for adjusting the length of the shoulder belt; and the head protection device in accordance with one or more embodiments, wrapping the shoulder belt and the length adjustment device.

In an embodiment, the carrier further comprises: two waist belts; a crotch belt; and a connecting buckle, the waist belt is symmetrically arranged on the left and right opposite sides of the seating area of the seat, the crotch belt is arranged at the relative center of the seating area of the seat, and the two shoulder belts, the two waist belts and the crotch belt are detachably connected to the seat by being connected to the connecting buckle, respectively.

BRIEF DESCRIPTION OF THE DRAWINGS

In the following text, embodiments of the present application will be further described in detail with reference to the accompanying drawings, in which.

LIST OF REFERENCE MARKS

Figure 1:
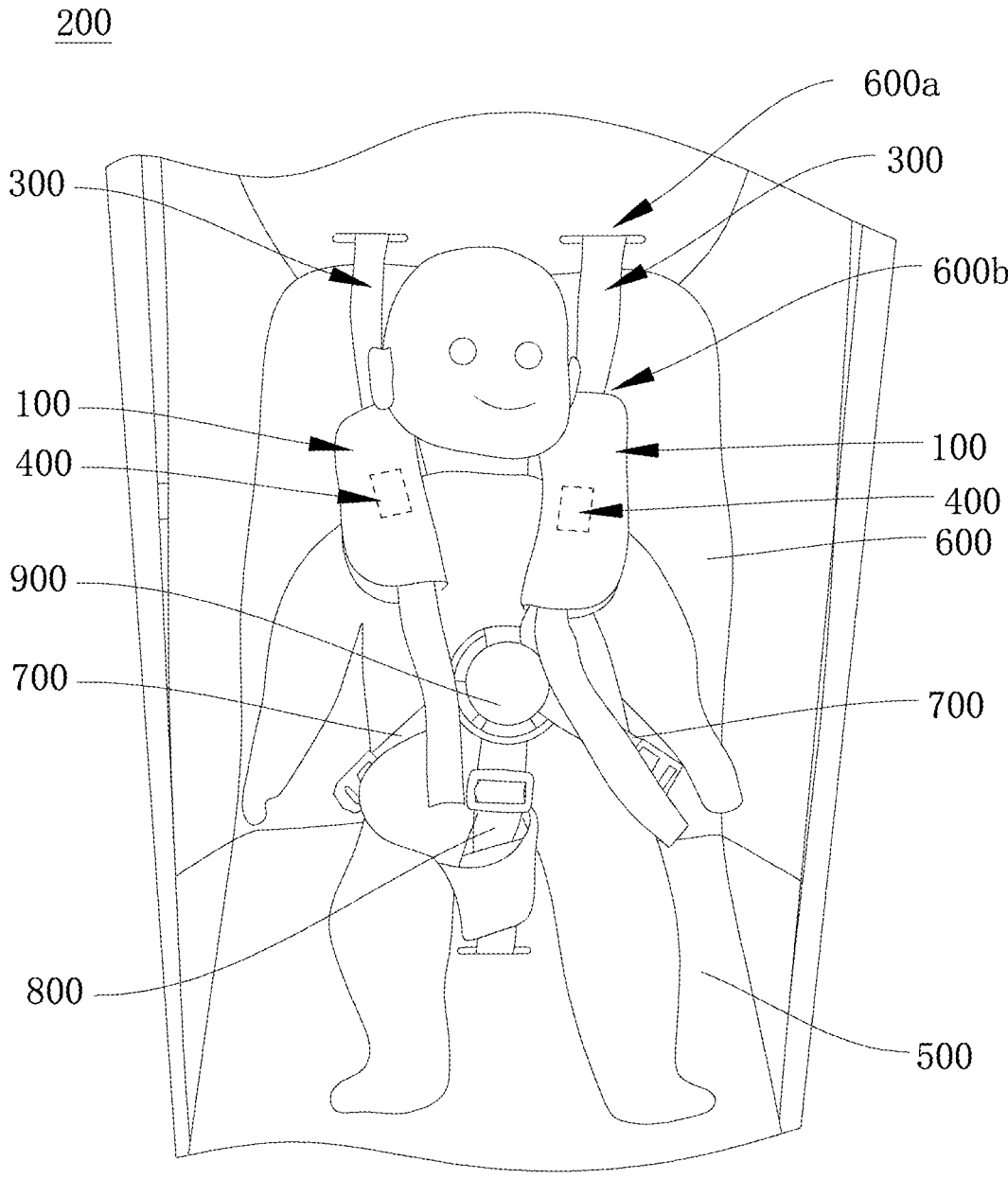
FIG. 1 is a schematic view of the structure of the carrier according to the present application.

100 Head Protection Device
  10 Protection Sheet
    10*a* First Part
    10*b* Second Part
  20 Connecting Member
    21 Male Buckle
    22 Female Buckle
  30 Limiting Structure
    31 First Slot
    32 Second Slot
    33 Limiting Member
      331 First Hole
      332 Second Hole
    34 Positioning Belt
      341 End Part
      342 Middle Part
      343 Gap
  40 Folding Line
200 Carrier
300 Shoulder Belt
  301 First Belt (Upper Shoulder Belt)
    301*a* Upper Connecting End
    301*b* Lower Connecting End

301*c* Upper Part
    301*d* Lower Part
  302 Second Belt (Lower Shoulder Belt)
    302*a* Connecting End
    302*b* Free End
    302*c* Connecting Part
    302*d* Adjusting Part
400 Length Adjustment Device
  410 First Adjustment Member
    401 Through gap
    402 First Column
    403 Second Column
    404 Edge Part
  420 Second Adjustment Member
500 Seat
600 Backrest
  600*a* Upper End
  600*b* Middle Upper End
700 Waist Belt
800 Crotch Belt
900 Connecting Buckle

DETAILED DESCRIPTION

Although specific embodiments are referred herein to illustrate and describe the present invention, however, the present invention should not be limited to the details shown. Specifically, within the scope of the equivalent scheme of the patent application and without departing from the patent, various modifications can be made to these details.

The descriptions of "front", "back", "up", "down" and other directions mentioned herein are only for the convenience of understanding. The patent is not limited to these directions, but can be adjusted according to actual situations.

The first embodiment of the present application is described with reference to FIGS. 1-6. The first embodiment of the present application provides a carrier 200 including a seat 500, a backrest 600 connected to the seat 500, two shoulder belts 300 connected between the seat 500 and the backrest 600, two length adjustment devices 400 that wound by the two shoulder belts 300 respectively, and two head protection devices 100 that wrap the two shoulder belts 300 and the two length adjustment devices 400 respectively (the head protection devices 100 wrap the shoulder belt 300 does not means that the shoulder belt 300 is entirely wrapped, but only a part of the shoulder belt 300 that adjacent to the length adjustment device 400 is wrapped). The opposite ends of the shoulder belt 300 are directly or indirectly connected to the backrest 600 and the seat 500, and the length adjustment device 400 and the head protection device 100 are slidable relative to the shoulder belt 300 along the length extension direction of the shoulder belt 300 on the shoulder belt 300. In order to adapt to the young children of different age groups and body types, the shortest extension length of the shoulder belt 300 between the two ends is adjustable, and the length adjustment device 400 on the shoulder belt 300 is slidable to adjust the shortest extension length between the two opposite ends of the shoulder belt 300, so that the two shoulder belts 300 can adaptively restrain the baby sitting in the baby carrier 200 to ensure safety, while the head protection device 100 serves to wrap the length adjustment device 400 and its nearby shoulder belt 300 to avoid collision or friction between the length adjustment device 400 and its nearby shoulder belt 300 and the head and neck of the baby, which may cause injury to the baby. Similarly, to adapt to the use of young children of different age groups and body types, the sliding of the head protection device 100 on the shoulder belt 300 is to facilitate users to adjust the position of the head protection device 100 in the length extension direction of the shoulder belt 300 to match the head and neck of young children of different age groups and body types. As required, the carrier 200 is further provided with two waist belts 700 on the left and right opposite sides of the seating area of the seat 500, and a crotch belt 800 is provided at the relative center of the seating area of the seat 500 (i.e. corresponding to the position between the legs of the child). Two waist belts 700 and the crotch belt 800 are respectively connected to the connecting buckle 900, so that they can be detachably connected to the seat 500 through the connecting buckle 900. During use, the connecting buckle 900 is generally located at the waist and abdomen of young children. In the present application, the carrier 200 includes but not limited to, for example, a stroller, a baby basket, a sleeping box, a safety seat, and a baby chair.

In this embodiment, the upper ends of two shoulder belts 300 are directly connected to the backrest 600, and the lower ends of two shoulder belts 300 are respectively connected to the connecting buckle 900 to indirectly connect to the seat 500, wherein the connection between the lower end of the shoulder belt 300 and the connecting buckle 900 is also detachable. In other embodiments, the lower end of the shoulder belt 300 can also be directly connected to the seat 500, for example, the lower end of the shoulder belt 300 can be directly connected to the housing or seat cloth corresponding to the seat 500.

Referring to FIGS. 2 to 6, the head protection device 100 according to the first embodiment of the present application is described.

The head protection device 100 includes a protection sheet 10, a limiting structure 30, and at least one connecting member 20. The protection sheet 10 is the part where the head protection device 100 wraps the shoulder belt 300 and the length adjustment device 400, and the limiting structure 30 is the part where the shoulder belt 300 passes through the protection sheet 10, so that the protection sheet 10 is slidable relative to the shoulder belt 300 along the length extension direction of the shoulder belt 300 under the pulling of the user, thereby achieving position adjustment. The connecting member 20 serves to keep the protection sheet 10 in the wrapped state.

The protection sheet 10 includes a first part 10A, a second part 10B, and a folding line 40 located between the first part 10A and the second part 10B. When the protection sheet 10 is in an unfolded state, the first part 10A and the second part 10B are in the same plane (refer to FIGS. 2, 3, and 4). At this point, the length adjustment device 400 that should be wrapped by the protection sheet 10 and part of the shoulder belt 300 are located on the same side of the protection sheet 10 and within the periphery edges of the protection sheet 10. The user can easily operate to adjust the position of the length adjustment device 400. When the protection sheet 10 is folded along the longitudinal folding line 40, the first part 10A will be folded in half towards the second part 10B, causing the first part 10A to be set opposite the second part 10B, thereby placing the protection sheet 10 in a wrapped state (refer to FIGS. 5 and 6). At this time, the length adjustment device 400 that should be wrapped by the protection sheet 10 and part of the shoulder belt 300 are located between the first part 10A and the second part 10B, and are facing the first part 10A and the second part 10B, which is covered by the first part 10A and the second part 10B. In this embodiment, the protection sheet 10 is made of flexible material, roughly rectangular in shape. In other embodiments, the protection sheet 10 may include three parts and two folding lines located within the three parts, and two of the three parts are the first part 10A and the second part 10B, one of the two folding lines is the folding line 40, and the last part is folded outside the second part 10B through another folding line.

The limiting structure 30 is arranged in the protection sheet 10, the limiting structure 30 includes a first slot 31 and a second slot 32 arranged at intervals. The first slot 31 and the second slot 32 are arranged to pass through the protection sheet 10, and the shoulder belt 300 passes through the first part 10A at two positions on the first part 10A in two opposite directions through the first slot 31 and the second slot 32. Due to the shoulder belt 300 passes through the first slot 31 and the second slot 32 located at different positions on the first part 10A in opposite directions, the friction force between the shoulder belt 300, the edge of the first slot 31 and the edge of the second slot 32 serves to prevent the protection sheet 10 from sliding downward along the shoulder belt 300 due to gravity. Then, the protection sheet 10 is temporarily positioned at a certain position in the length extension direction of the shoulder belt 300, limiting the sliding of the protection sheet 10 relative to the shoulder belt 300. That is, the limiting structure 30 serves to position the protection sheet 10 at a certain position in the length extension direction of the shoulder belt 300. When a pulling force is applied to the protection sheet 10 in the length extension direction of the shoulder belt 300, the protection sheet 10 can overcome the friction force between it and the shoulder belt 300 and slide along the length extension direction of the shoulder belt 300 to adjust the position of the protection sheet 10 in the length extension direction of the shoulder belt 300. More specifically, the limiting structure 30 is arranged on a lateral side (such as the left side) of the folding line 40. It should be understood that according to the folding direction of the protection sheet 10, the limiting structure 30 can also be set on the right side of the folding line 40 (refer to FIG. 7). In this embodiment, the periphery edges of each of the first slot 31 and the second slot 32 are continuously extending, that is, the first slot 31 and the second slot 32 are both limited to a closed contour in the plane where the protection sheet 10 is located (i.e. the plane shown in FIG. 2), and the first slot 31 and the second slot 32 are passable only in the direction perpendicular to the plane, so that the shoulder belt 300 will not detach from the first slot 31 and the second slot 32 in a lateral direction (such as the right and left directions shown in FIG. 2). When the protection sheet 10 is pulled by the user, the edge of the first slot 31 and the edge of the second slot 32 are evenly stressed, and because the edge of the first slot 31 and the edge of the second slot 32 are not provided with notches, it is avoided that when a force is applied to the edge of the first slot 31 and the edge of the second slot 32, it will cause the protection sheet 10 to tear along the notches at the edge of the first slot 31 and the edge of the second slot 32. In this embodiment, the first slot 31 and the second slot 32 are two openings on the protection sheet 10.

The connecting member 20 is arranged on the first part 10A and the second part 10B of the protection sheet 10. In this embodiment, the connecting member 20 is a male buckle 21 arranged on the first part 10A and a female buckle 22 arranged on the second part 10B, and the protection sheet 10 is equipped with two sets of connecting members 20. After the protection sheet 10 is in the wrapped state, the male buckle 21 and the female buckle 22 of the first part 10A and the second part 10B can be interlocked to keep the protection sheet 10 in the wrapped state. In other embodiments, the connecting member 20 can also be in other appropriate forms, such as Velcro, adhesive buckle, magnetic buckle, etc., as long as the protection sheet 10 is kept in a wrapped state.

Referring to FIGS. 3 to 6, the positions and connection relationships between the shoulder belt 300, the length adjustment device 400, and the head protection device 100 according to the first embodiment of the present application are described.

In this embodiment, the shoulder belt 300 includes a first belt 301 and a second belt 302 wound around the length adjustment device 400, that is, the first belt 301 and the second belt 302 are indirectly connected together through the length adjustment device 400, and the first belt 301 and the second belt 302 are independently arranged without cross extension between the two. As both the first belt 301 and the second belt 302 are wound around the length adjustment device 400, it can be seen that when the length adjustment device 400 is wrapped by the protection sheet 10, at least some part of the first belt 301 and the second belt 302 can also be wrapped by the protection sheet 10. The first belt 301 serves to connect with the backrest 600, and the second belt 302 serves to connect with the seat 500 to form a shoulder belt 300 connected between the backrest 600 and the seat 500. The length of the shoulder belt 300 is not the sum of the actual length of the first belt 301 and the actual length of the second belt 302, but the relative length between the end of the first belt 301 that is far away from the second belt 302 and connected to the backrest 600 and the end of the second belt 302 that is indirectly connected to the seat 500, and the relative length is not a straight length, but the shortest length formed by the extension of the first belt 301 and the second belt 302 between the two ends. Due to the connection between the first belt 301 and the backrest 600, the first belt 301 can also be referred to as the upper shoulder belt, while the second belt 302 is connected to the seat 500, so the second belt 302 can also be referred to as the lower shoulder belt. In this embodiment, the length extension direction of the first belt 301 and the second belt 302 is defined as longitudinal direction, and the width extension direction of the first belt 301 and the second belt 302 is defined as transverse direction.

Specifically, the first belt 301 includes an upper connecting end 301a and a lower connecting end 301b located at both ends of its length direction, and an upper part 301c and a lower part 301d that are located between the upper connecting end 301a and the lower connecting end 301b and connected to each other. The upper connecting end 301a is connected to the upper end 600a of the backrest 600, and the lower connecting end 301b is connected to the backrest 600 at a different position from the position of the upper connecting end 301a, for example, the lower connecting end 301b is connected to the middle upper end 600b of the backrest 600. The upper connecting end 301a and lower connecting end 301b can be sewn to the backrest 600, or can pass through the holes (not shown) opened in the backrest 600 and extend to the other side of the backrest 600, thereby connecting to the frame of the backrest 600 (not shown). The length adjustment device 400 slides between the upper connecting end 301a and the lower connecting end 301b to adjust the position of the length adjustment device 400 in the first belt 301 in the longitudinal direction.

Specifically, the second belt 302 includes a connecting end 302a and a free end 302b located at both ends of its length direction, and a connecting part 302c and an adjusting part 302d located between the connecting end 302a and the free end 302b and connected to each other. Wherein the connecting end 302a is detachably connected to the seat 500 through the connecting buckle 900, and the free end 302b is not connected to any components for the user to move. The length adjustment device 400 slides between the connecting end 302a and the free end 302b to adjust the extension length of the second belt 302 between the length adjustment device 400 and the connecting end 302a to match the upper body weight of young children of different age groups and body types, in order to comfortably bind the young children to the carrier 200. This adjustment method is achieved by moving the free end 302b.

In this embodiment, the length of shoulder belt 300 is the shortest length formed by the extension of the first belt 301 and the second belt 302 between the upper connecting end 301a and the connecting end 302a.

In this embodiment, the length adjustment device 400 is a first adjustment member 410, the first adjustment member 410 is a ladder-shaped adjustment member with a first column 402 and a second column 403 extending laterally to be wrapped by the shoulder belt 300, and a through gap 401 between the first column 402 and the second column 403. Wherein the first belt 301 is wrapped around the first column 402, and the second belt 302 is wrapped around the second column 403. The structure of the first adjustment member 410 is to provide sufficient friction to prevent the first adjustment member 410 from sliding relative to the first belt 301, and to prevent the first adjustment member 410 from sliding relative to the second belt 302. However, the user can slightly relax the first belt 301 and the second belt 302, allowing the first adjustment member 410 to slide relative to the first belt 301 along the length extension direction of the first belt 301, and allowing the first adjustment member 410 to move relative to the second belt 302 along the length extension direction of the second belt 302.

It should be understood that in other embodiments, the first adjustment member 410 can also be other types of length adjustment devices such as calipers, as long as the first belt 301 and second belt 302 can be adjusted to pass through the length adjustment device.

In this embodiment, the first part 10A of the head protection device 100 is located between the backrest 600 and the first adjustment member 410, whether when the protection sheet 10 is in the unfolded or wrapped state, to better wrap the first adjustment member 410 on the side close to the backrest 600 of the first adjustment member 410, avoiding friction on the head and neck of the baby on the same side of the backrest 600 from the first adjustment member 410. When the protection sheet 10 is in the wrapped state, the second part 10B and the first part 10A are located on opposite sides of the first adjustment member 410, that is, the second part 10B is located on the side of the first adjustment member 410 facing away from the backrest 600.

In this embodiment, the first belt 301 passes through the first part 10A in two opposite directions at two positions of the first part 10A through the first slot 31 and the second slot 32, in order to temporarily position the protection sheet 10 at a point in the length extension direction of the first belt 301 and prevent the sliding of the protection sheet 10 relative to the first belt 301. It can be seen that at this time, the first belt 301 is wound to both the first part 10A and the first adjustment member 410, and the first adjustment member 410 is located on the side of the first part 10A facing away from the backrest 600.

In this embodiment, when the user pulls the protection sheet 10 to adjust its position on the first belt 301, whether the protection sheet 10 is in the unfolded or wrapped state, the first adjustment member 410 can synchronously slide with the sliding of the protection sheet 10. For this, the upper part 301*c* is connected to the upper connecting end 301*a* and extends from the side of the first part 10A facing the backrest 600 (i.e. the right side of the protection sheet 10 in FIG. 4) through the protection sheet 10 (i.e. pass through the first slot 31 of the limiting structure 30) to the side of the first part 10A facing away from the backrest 600 (i.e. the left side of the protection sheet 10 in FIG. 4), and extends from the side of the first adjustment member 410 facing the first part 10A (i.e. the side of the first part 10A facing away from the backrest 600) through the first adjustment member 410 to the side of the first adjustment member 410 facing away from the first part 10A. The lower part 301*d* extends from the side of the first adjustment member 410 facing away from the first part 10A through the first adjustment member 410 to the side of the first adjustment member 410 facing the first part 10A, and extends from the side of the first part 10A facing away from the backrest 600 through the protection sheet 10 (i.e., pass through the second slot 32 of the limiting structure 30) to the side of the first part 10A facing the backrest 600 to connect with the lower connecting end 301*b*. In this manner, the first belt 301 passes through the protection sheet 10 in opposite directions at two positions on the first part 10A through the first slot 31 and the second slot 32 respectively. In other embodiments, the limiting structure 30 can also be more than two gaps for the first belt 301 to pass through in opposite directions in sequence.

In this embodiment, the upper part 301*c* and the lower part 301*d* are wrapped around the first column 402 of the first adjustment member 410, with the upper part 301*c* and the lower part 301*d* respectively located on two sides of the first column 402, and the lower part 301*d* passes through the through gap 401. It should be understood that the upper part 301*c* and the lower part 301*d* are different names given to different parts of the first belt 301 for ease of understanding. The first belt 301 can be a whole belt, and the first adjustment member 410 can slide longitudinally along the first belt 301. Therefore, the range of the so-called "upper part 301*c*" and "lower part 301*d*" varies according to the sliding of the first adjustment member 410.

In this embodiment, the sizes of the first slot 31 and the second slot 32 are both set to prevent the first adjustment member 410 from passing through along the thickness extension direction (i.e. the thickness direction in FIG. 4) of the first belt 301, so as to maintain the relative position relationship between the protection sheet 10 and the first adjustment member 410 during the sliding process, and thereby achieve synchronous sliding (that is, when the first adjustment member 410 slides, the protection sheet 10 can slide with the first adjustment member 410, and similarly, when the protection sheet 10 slides, the first adjustment member 410 can also slide with the protection sheet 10). Specifically, in the length direction of the first belt 301 (referring to FIGS. 2 and 3, where the length direction of the first belt is the longitudinal direction in the figures), the size of the first slot 31 and the size of the second slot 32 are both smaller than the size of the first adjustment member 410, so that the first adjustment member 410 cannot penetrate through the first slot 31 or the second slot 32 from the side of the first part 10A facing away from the backrest 600 to the side of the first part 10A facing the backrest 600. And in the width extension direction of the first belt 301 (referring to FIGS. 2 and 3, the width direction of the first belt is the lateral direction in the figures), the size of the first slot 31 and the size of the second slot 32 are slightly greater than or equal to the size of the first belt 301 to avoid lateral shaking of the head protection device 100 relative to the first belt 301. In the width extension direction of the first belt 301, the size of the first slot 31 and the size of the second slot 32 are both smaller than the size of the length adjustment device 400. Alternatively, the size of the length adjustment device 400 in the thickness extension direction of the first belt 301 (referring to FIG. 4, where the thickness direction of the first belt is the thickness direction in the figure) is greater than the size of the first slot 31 and the size of the second slot 32 in the length extension direction of the first belt 301 (referring to FIGS. 3 and 4, where the length direction of the first belt is the longitudinal direction in the figure), so as to maintain the relative position between the protection sheet 10 and the first adjustment member 410.

In this embodiment, in the length extension direction of the first belt 301, the distance between the first slot 31 and the second slot 32 is smaller than the size of the first adjustment member 410, to avoid wrinkling of the protection sheet 10 between the first slot 31 and the second slot 32 when the first adjustment member 410 and the protection sheet 10 are synchronously sliding on the first belt 301 due to the distance between the first slot 31 and the second slot 32 is greater.

However, it should be understood that the protection sheet 10 can be made of flexible materials, so the shape and size of the first slot 31 and the second slot 32 opened on the protection sheet 10 are flexible and variable. Therefore, the specific size limitations mentioned above are just exemplary, and the first slot 31 or second slot 32 can be set to prevent the first adjustment member 410 from passing through in any appropriate manner in the art.

In this embodiment, the connecting part 302*c* and the adjusting part 302*d* of the second belt 302 are wrapped around the second column 403 of the first adjustment member 410. The connecting part 302*c* and the adjusting part 302*d* are located on two sides of the second column 403, and the connecting part 302*c* extends from the side of the first adjustment member 410 facing the first part 10A through the first adjustment member 410 to the side of the first adjustment member 410 facing away from the first part 10A. The adjusting part 302*d* extends from the side of the first adjustment member 410 facing away from the first part 10A through the first adjustment member 410 to the side of the first adjustment member 410 facing the first part 10A. In this embodiment, the adjusting part 302*d* is connected with the free end 302*b* and passes through the through gap 401, the connecting part 302*c* and the connecting end 302*a* are connected without passing through the through gap 401, the adjusting part 302*d* and the connecting part 302*c* overlap each other in the thickness direction of the first belt 301, and the free end 302*b* is located on the side of the connecting part 302*c* facing the first part 10A. During use, the length of the adjusting part 302*d* and the length of the connecting part 302*c* can be distributed by moving the free end 302*b* (by pulling any one of the adjusting part 302*d* and the free end 302*b*), thereby changing the extension length of the second belt 302 between the first adjustment member 410 and the connecting buckle 900, that is, the extension length of the connecting part 302*c*. The free end 302*b* is located on the side of the connecting part 302*c* facing the first part 10A to prevent the baby from accidentally pulling the adjusting part 302*d* and the free end 302*b* from accidentally adjusting the second belt 302 between the first adjusting buckle 410 and the connecting buckle 900. In other embodiments, the connecting part 302*c* can also be connected to the connecting end 302*a* and pass through the through gap 401, while the adjusting part 302*d* is connected to the free end 302*b* without passing through the through gap 401, so that the free end 302*b* is located on the side of the connecting part 302*c* facing away from the first part 10A for user adjustment.

In this embodiment, the length of shoulder belt 300 is the sum of the extension length of the upper part 301*c* of the first belt 301 and the extension length of the connecting part 302*c*.

Figure 7:
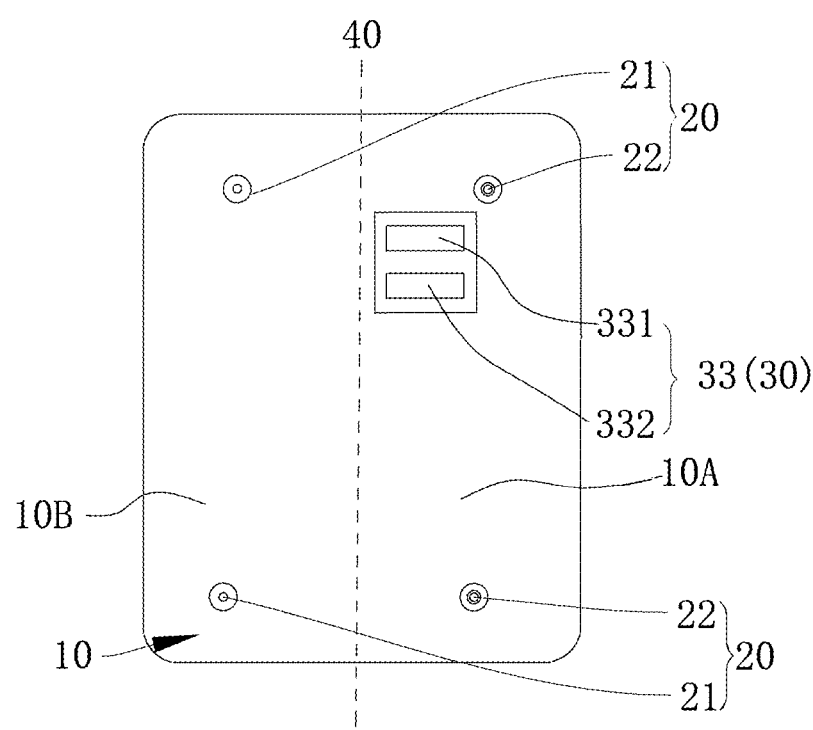
FIG. 7 is a schematic view of the unfolded state of the head protection device according to the second embodiment of the present application.
Figure 8:
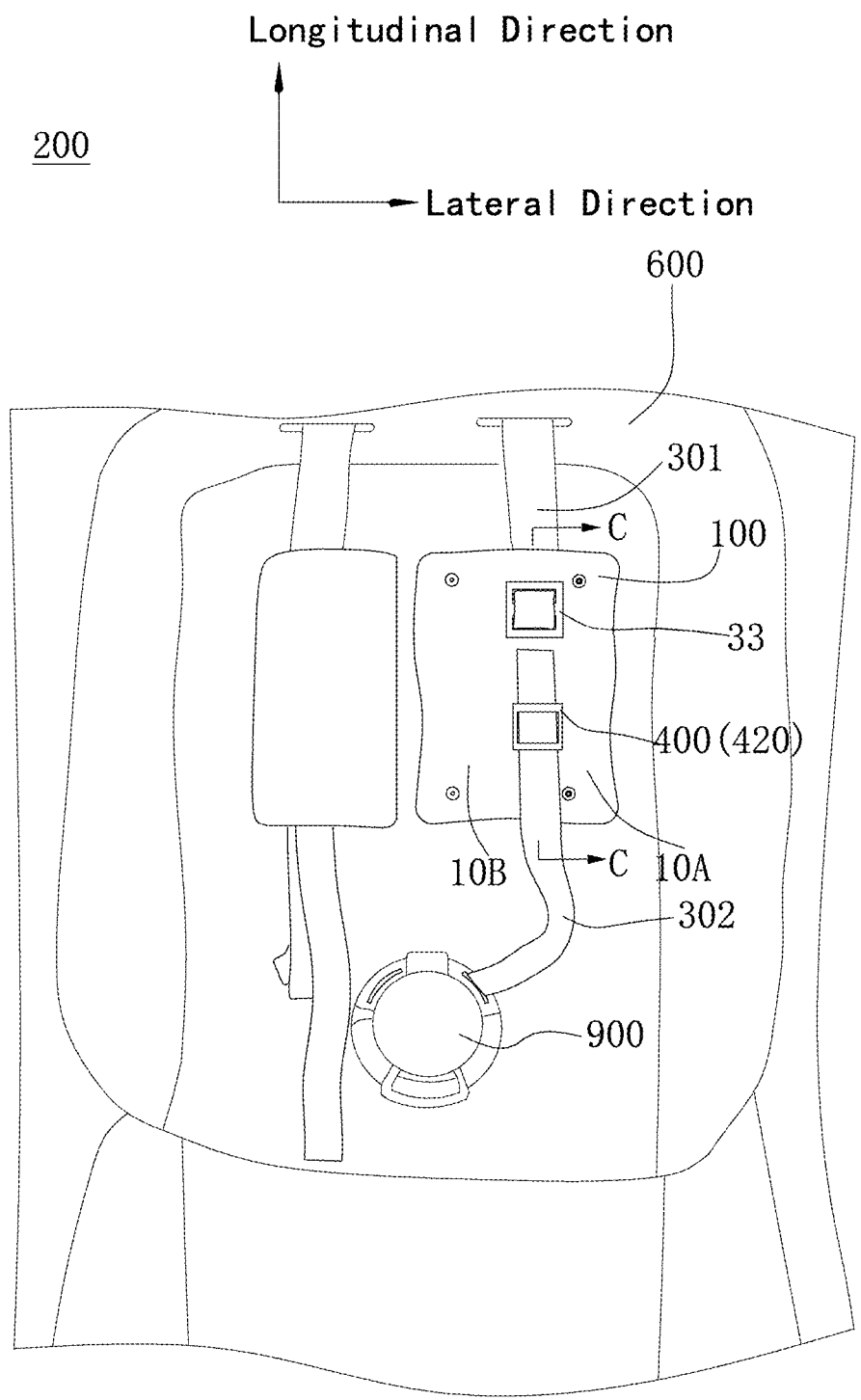
FIG. 8 is a schematic view of a carrier according to the second embodiment of the present application, wherein the head protection device is in an unfolded state.
Figure 9:
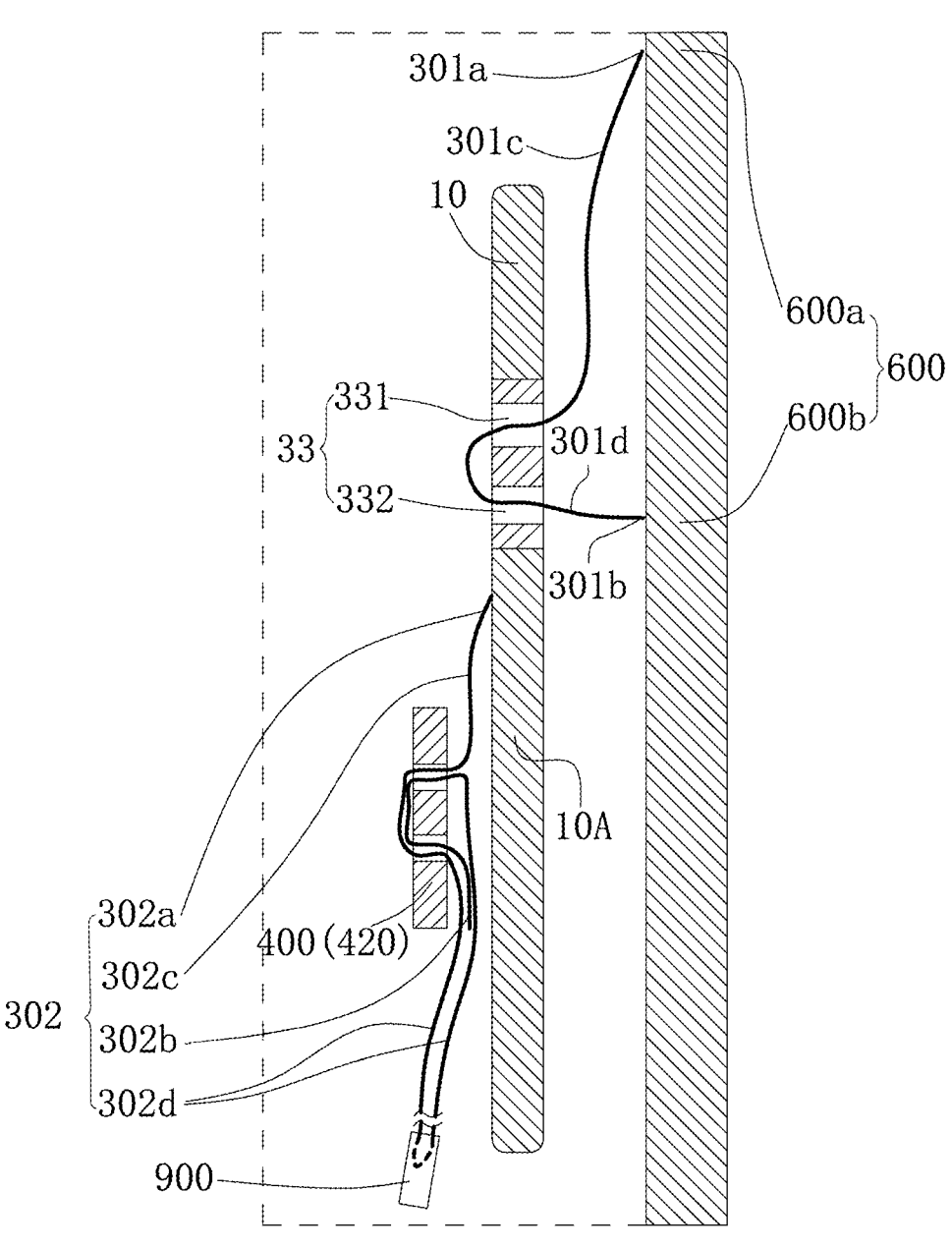
FIG. 9 is a partial schematic cross-sectional view taken along the C-C line in FIG. 8.

Referring to FIGS. 7 to 9, a carrier 200 according to the second embodiment of the present application is described.

Figure 2:
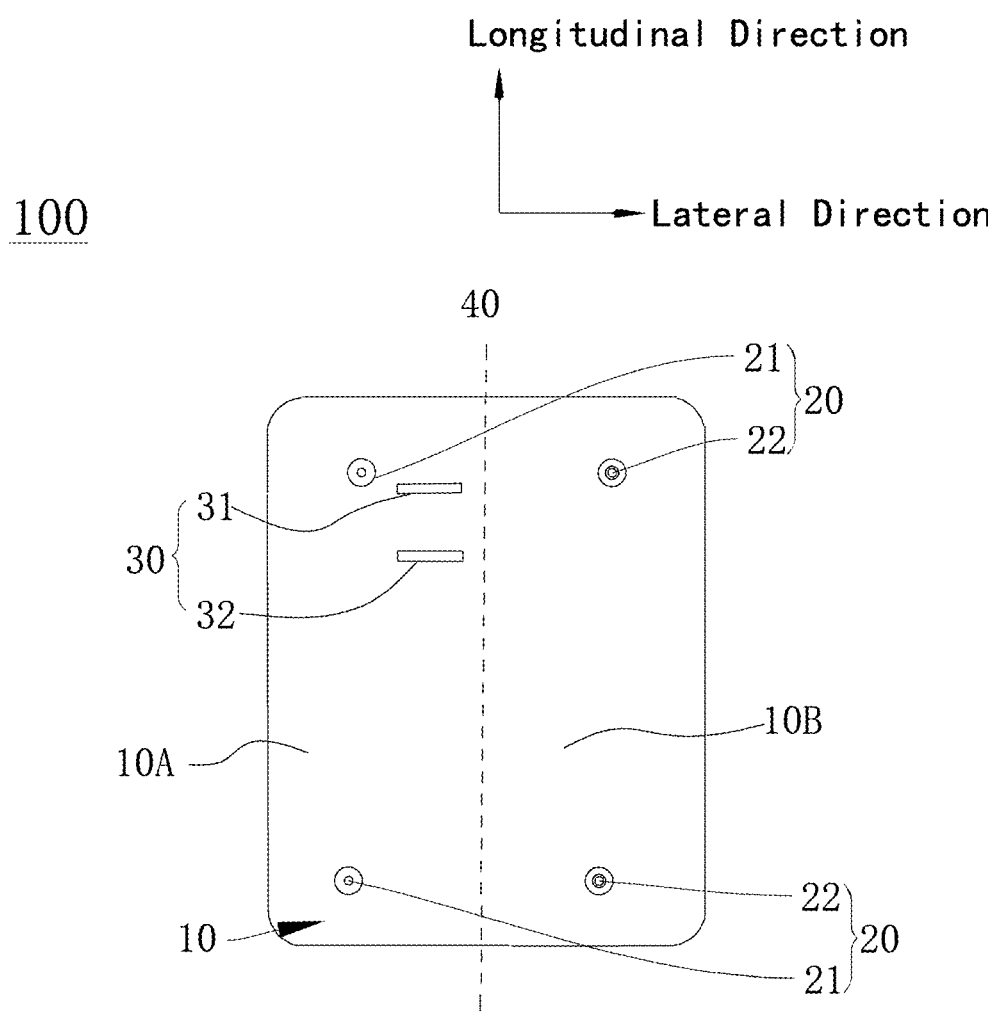
FIG. 2 is a schematic view of an unfolded state of the head protection device according to the first embodiment of the present application.
Figure 3:
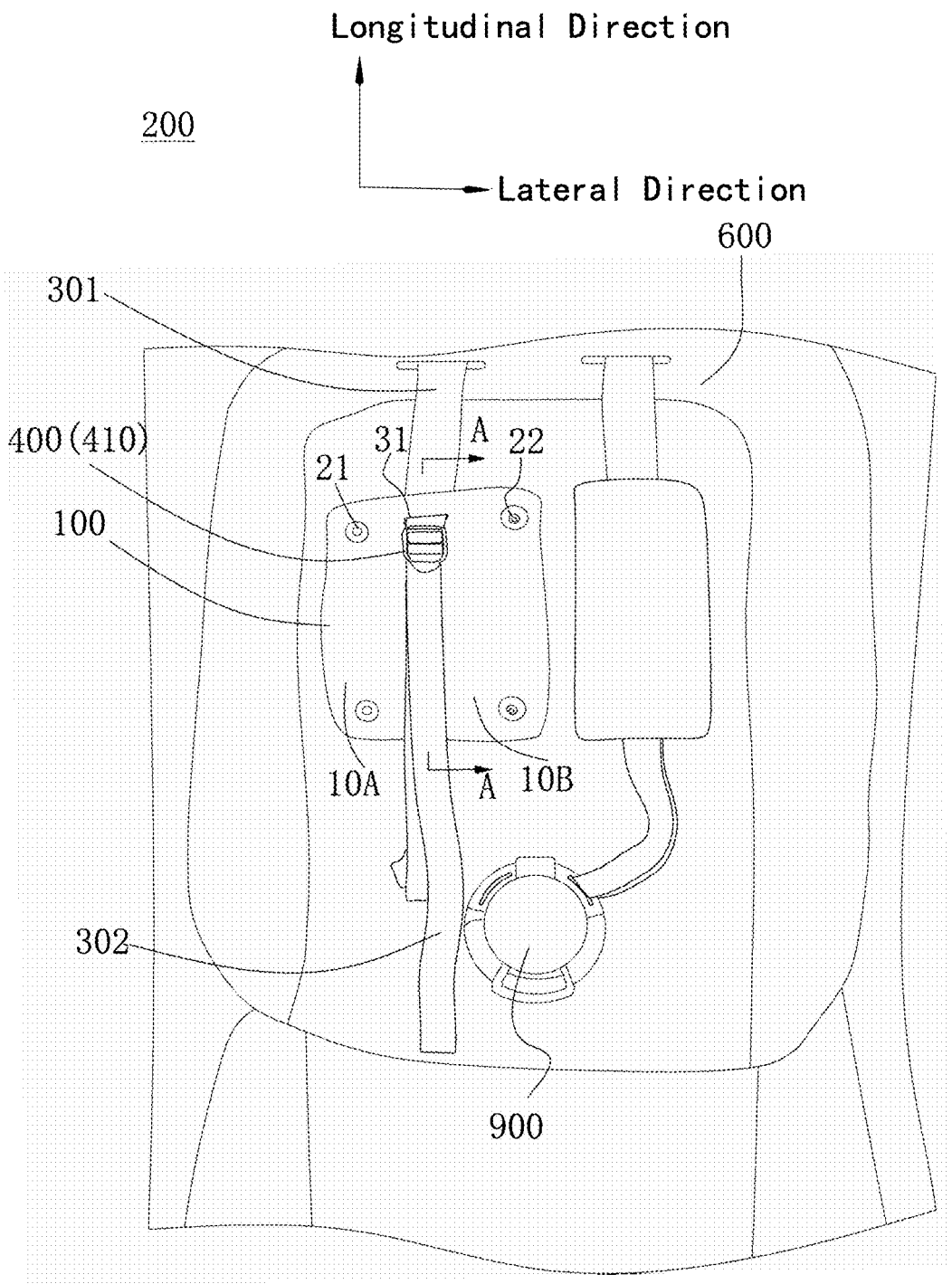
FIG. 3 is a schematic view of the carrier according to the first embodiment of the present application, wherein the head protection device is in an unfolded state.
Figure 4:
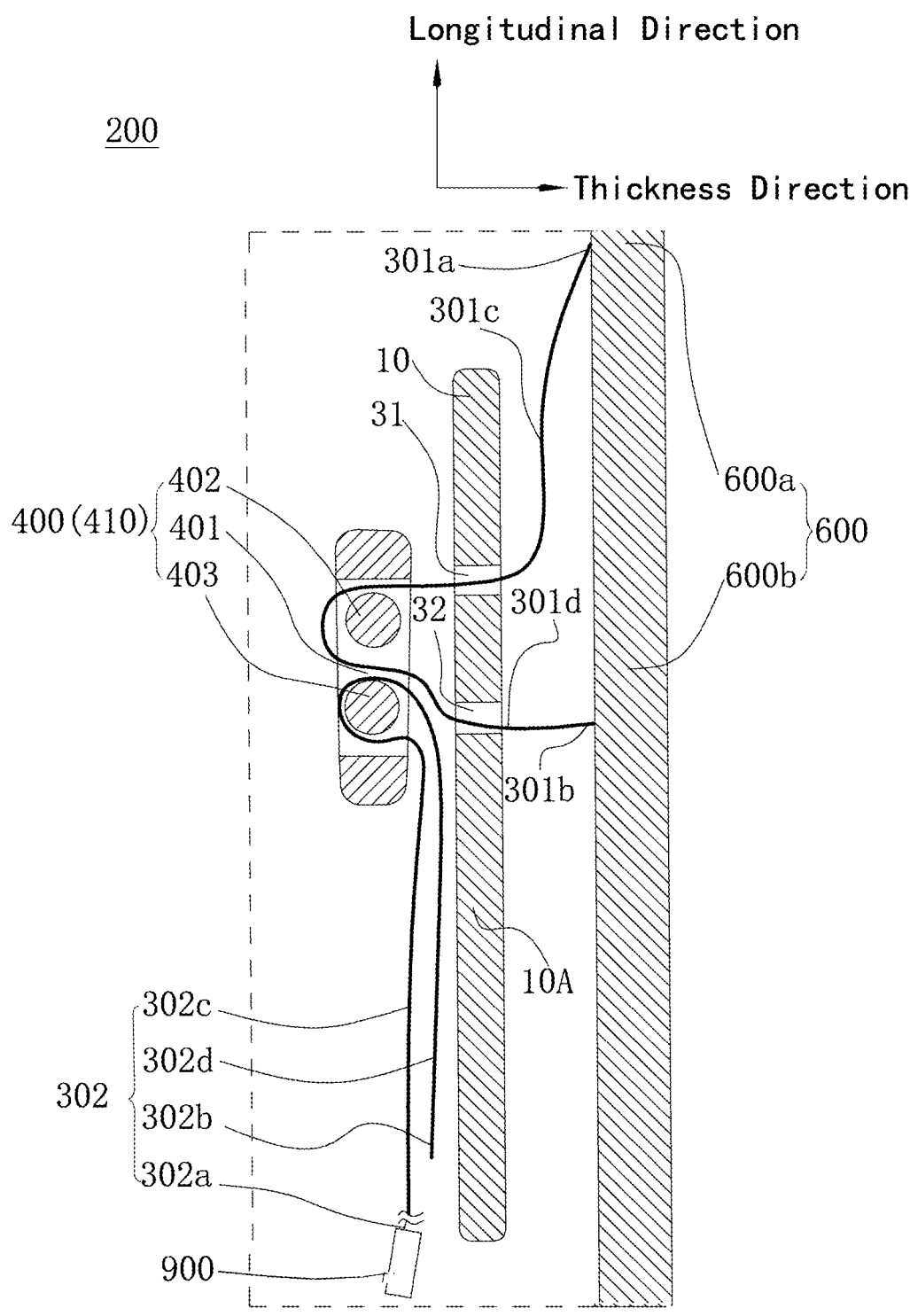
FIG. 4 is a partial schematic cross-sectional view taken along the A-A line in FIG. 3.
Figure 5:
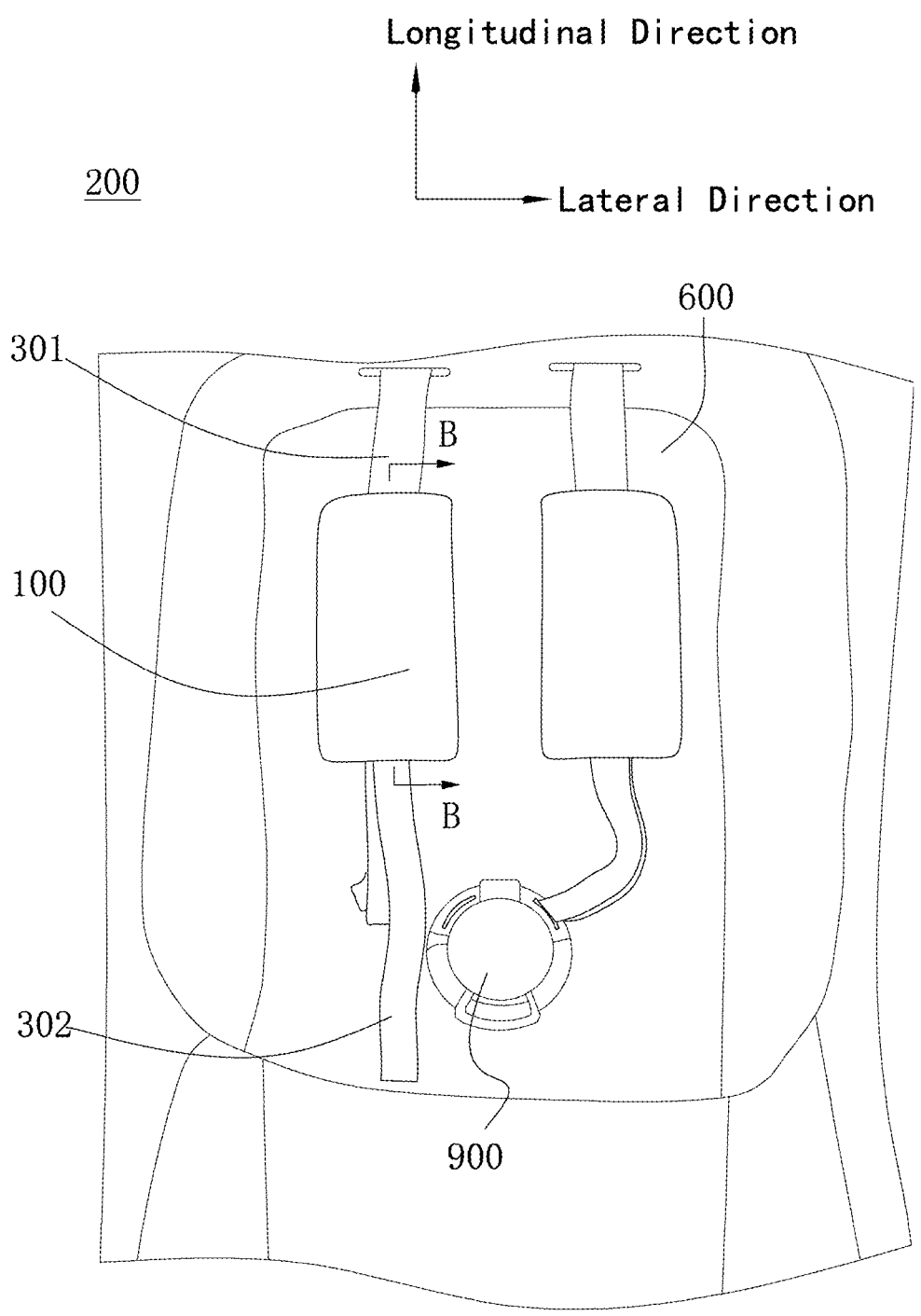
FIG. 5 is a schematic view of a carrier according to the first embodiment of the present application, wherein the head protection device is in a wrapped state.
Figure 6:
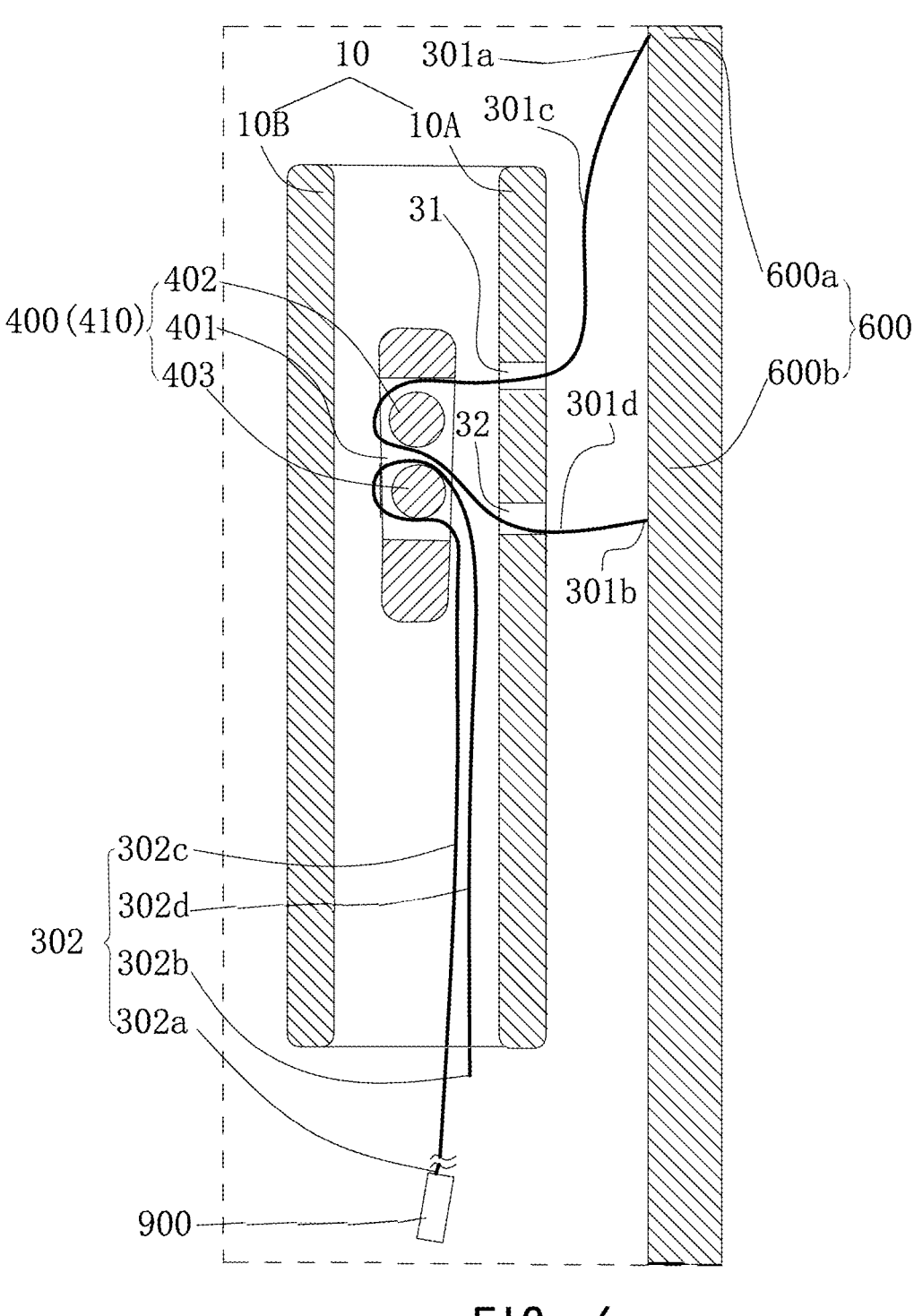
FIG. 6 is a partial schematic cross-sectional view taken along the B-B line in FIG. 5.

The carrier 200 of the second embodiment is roughly the same as the carrier 200 of the first embodiment, but there are also differences, as follows:

In the second embodiment, the limiting structure 30 is a limiting member 33 embedded in the protection sheet 10 and has a tri-glide shape, and the limiting member 33 has a first hole 331 and a second hole 332 spaced apart. The first slot 31 of the limiting structure 30 corresponds to the first hole 331, and the second slot 32 of the limiting structure 30 corresponds to the second hole 332, so that the first belt 301 passes through the protection sheet 10 in opposite directions. It would be understood that the limiting structure 30 of the first embodiment can be provided as a limiting member 33. Conversely, the limiting structure 30 in the second embodiment can also be two openings of the protection sheet 10 in the first embodiment. In the second embodiment, the limiting member 33 can be arranged on the lateral side of the folding line 40, as the right side shown in the figure. However, it should be understood that according to the folding direction of the protection sheet 10, the limiting member 33 can also be arranged on the left side of the folding line 40 (as shown in FIG. 2).

In the second embodiment, the shoulder belt 300 includes a first belt 301 and a second belt 302 that is wound around the length adjustment device 400 and passes through the connecting buckle 900. In this embodiment, the first belt 301 is consistent in structure with the first embodiment, except that it is not wound around the length adjustment device 400, and will not be further described herein. The second belt 302, on the other hand, is different. The second belt 302 includes a connecting end 302*a* and a free end 302*b* located at two ends of its length direction, and a connecting part 302*c* and an adjusting part 302*d* located between the connecting end 302*a* and the free end 302*b* and connected to each other. The connecting end 302*a* is fixedly connected to the protection sheet 10 through stitching, specifically connected to the side of the first part 10A facing away from the backrest 600. The length adjustment device 400 and the connecting buckle 900 slide relative to the second belt 302 between the connecting end 302*a* and the free end 302*b* to adjust the extension length of the second belt 302 between the connecting end 302*a* and the connecting buckle 900.

In the second embodiment, the length adjustment device 400 is the second adjustment member 420, and the second adjustment member 420 is a tri-glide adjustment member, the tri-glide adjustment member has a lateral column that extends laterally to provide for the second belt 302 of the shoulder belt 300 to wrap around.

In the second embodiment, the connecting part 302*c* is connected to the connecting end 302*a*, the adjusting part 302*d* is connected to the free end 302*b*, and the connecting part 302*c* and the adjusting part 302*d* are wound around the lateral column. Specifically, the connecting part 302*c* extends from the side of the length adjustment device 400 facing the first part 10A through the second adjustment member 420 (i.e. the side of the lateral column near the connecting end 302*a*) to the side of the second adjustment member 420 facing away from the first part 10A, and the adjusting part 302*d* extends from the side of the second adjustment member 420 facing away from the first part 10A through the second adjustment member 420 (i.e. the side of the lateral column near the connecting buckle 900) to the side of the second adjustment member 420 facing the first part 10A, and passes through the connecting buckle 900, and again extends from the side of the second adjustment member 420 facing the first part 10A through the second adjustment member 420 (i.e. the side of the lateral column near the connecting end 302*a*) to the side of the second adjustment member 420 facing away from the first part 10A, and then extends from the side of the second adjustment member 420 facing away from the first part 10A through the second adjustment member 420 (i.e. the side of the lateral column near the connecting buckle 900) to the side of the second adjustment member 420 facing the first part 10A. The second adjustment member 420 and the connecting buckle 900 slide on the second belt 302 to distribute lengths of the adjusting part 302*d* and the connecting part 302*c*. When in use, by moving the free end 302*b* to distribute lengths of the adjusting part 302*d* and the connecting part 302*c*, the extension length of the second belt 302 between the connecting end 302*a* and the connecting buckle 900 is changed.

It should be understood that the connecting part 302*c* and the adjusting part 302*d* are different names given to different parts of the second belt 302 for ease of understanding. The second belt 302 can be a whole belt and can slide through the second adjustment member 420, so the range of the so-called "connecting part 302*c*" and "adjusting part 302*d*" varies according to the sliding of the second belt 302.

It should also be understood that the second belt 302 and the second adjustment member 420 can be set to other known forms in the art, as long as the extension length of the second belt 302 between the connecting end 302*a* and the connecting buckle 900 can be adjusted. For example, the second adjustment member 420 can be replaced by a caliper or a winder.

In this embodiment, the length of shoulder belt 300 is the shortest length formed by the extension of the first belt 301 and the second belt 302 between the upper connecting end 301*a* of the first belt 301 and the connecting buckle 900, which is the sum of the extension length of the upper part 301*c* of the first belt 301 and the extension length between the connecting end 302*a* of the second belt 302 and the connecting buckle 900.

In this embodiment, the connecting end 302*a* of the second belt 302 wrapped around the second adjustment member 420 is directly fixed to the protection sheet 10, so as to ensure that when the protection sheet 10 is pulled by the user to adjust its position on the first belt 301, whether in the unfolded or wrapped state, the second adjustment member 420 can synchronously slide with the sliding of the protection sheet 10. In this manner, when the protection sheet 10 slides, the second belt 302 fixedly connected to the protection sheet 10 and the second adjustment member 420 thereon also slide synchronously, ensuring that the second adjustment member 420 is located on the side of the first part 10A facing away from the backrest 600, whether in the unfolded or wrapped state, that is, the second adjustment member 420 has a part opposite to the first part 10A, so as to avoid the head and neck of the the baby being rubbed by the second adjustment member 420 and its nearby shoulder belt 300. Due to the fact that part of the first belt 301 passes through the protection sheet 10 in opposite directions, and the second adjustment member 420 and the second belt 302 wrapped around it are both on the side of the first part 10A facing away from the backrest 600 both in the unfolded and wrapped state, it should be understood that when the protection sheet 10 is in the wrapped state, at least the second adjustment member 420, part of the first belt 301, and part of the second belt 302 are wrapped.

The remaining parts of the second embodiment are the same as the first embodiment and will not be repeated here.

Figure 10:
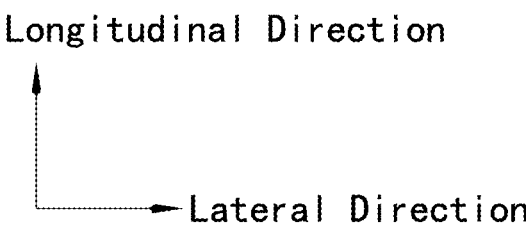
FIG. 10 is a schematic view of the unfolded state of the head protection device according to the third embodiment of the present application.
Figure 10:
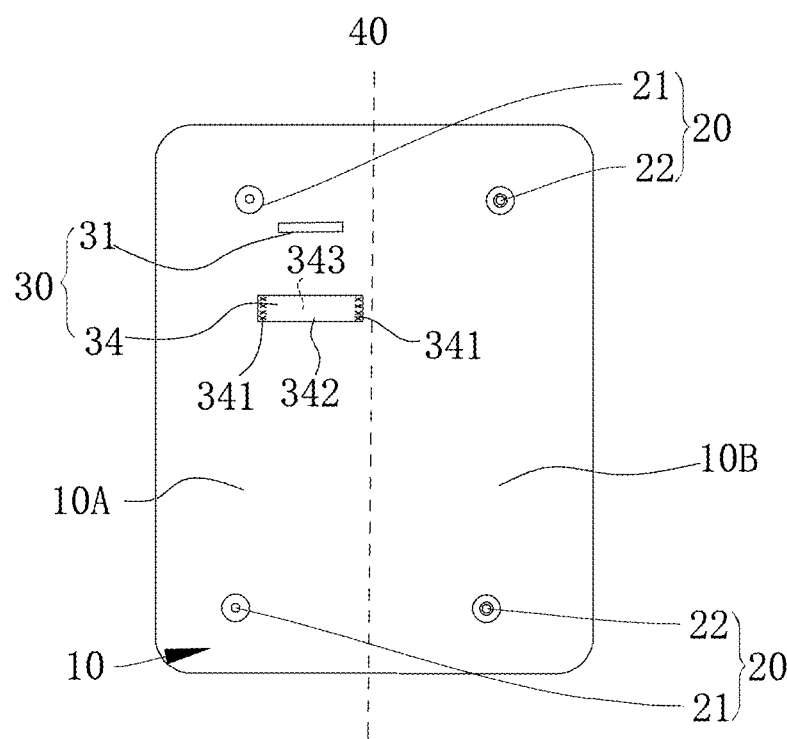
Figure 11:
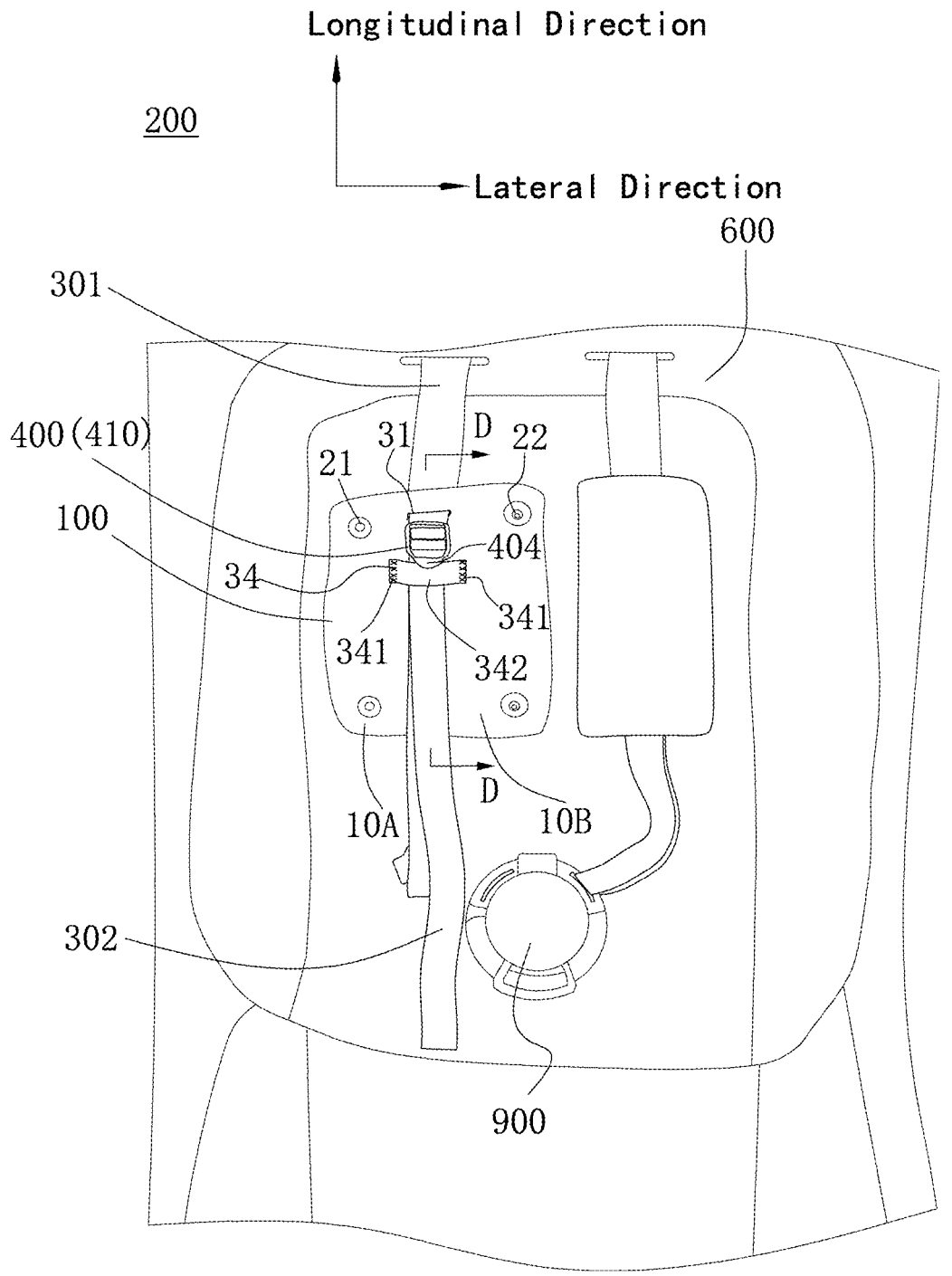
FIG. 11 is a schematic view of a carrier according to the third embodiment of the present application, wherein the head protection device is in an unfolded state.
Figure 12:
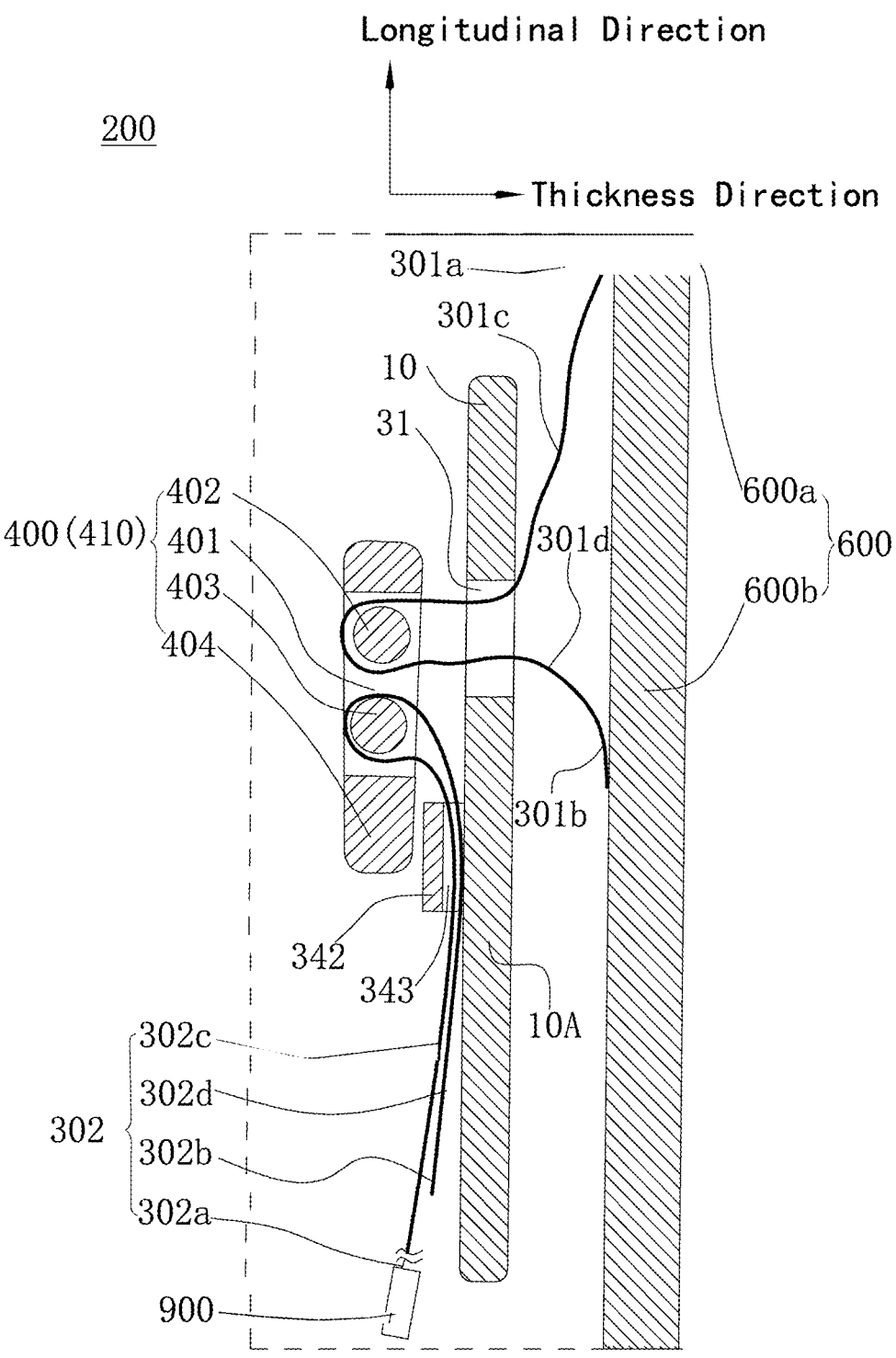
FIG. 12 is a partial schematic cross-sectional view taken along the D-D line in FIG. 11.

Referring to FIGS. 10 to 12, a carrier 200 according to the third embodiment of the present application is described.

The carrier 200 of the third embodiment is similar to the carrier 200 of the first embodiment, but there are also differences, as follows:

In the third embodiment, there is only the first slot 31 and no second slot 32 in the limiting structure 30. The upper part 301c extends from the side of the first part 10A facing the backrest 600 through the first slot 31 and the length adjustment device 400 directly to the side of the length adjustment device 400 facing away from the first part 10A. The lower part 301d extends from the side of the length adjustment device 400 facing away from the first part 10A through the length adjustment device 400 and the first slot 31 back to the side of the first part 10A facing the backrest 600. The third embodiment reduces the number of slots on the protection sheet 10, thus simplifying the manufacturing process and making the position of the slots more flexible.

In the third embodiment, as shown in FIG. 12, in the length extension direction of the first belt 301 (i.e. the longitudinal direction in FIG. 12), the size of the first slot 31 is smaller than the size of the length adjustment device 400, so that the length adjustment device 400 cannot pass through the first slot 31 along the thickness extension direction of the first belt 301 (i.e. the thickness direction in FIG. 12) in the state shown in FIGS. 11 and 12. Thus, maintaining the relative position relationship between the protection sheet 10 and the length adjustment device 400 during the sliding process can achieve synchronous sliding, which is the same as in the first embodiment. However, for the convenience of cleaning the protection sheet 10, it is required that the protection sheet 10 can be removed from the first belt 301 and the second belt 302. Therefore, the first slot 31 is set to allow the length adjustment device 400 to rotate 90° in the state shown in FIGS. 11 and 12, and move from the side of the protection sheet 10 facing away from the backrest 600 through the protection sheet 10 to the side of the protection sheet 10 facing the backrest 600, causing the protection sheet 10 to be detached from the first belt 301. Therefore, in the states shown in FIGS. 11 and 12, in the width extension direction of the first belt 301, the size of the first slot 31 is greater than the size of the length adjustment device 400 (see FIGS. 10 and 11, the width direction of the first belt 301 is the lateral direction), and the size of the length adjustment device 400 in the thickness extension direction of the first belt 301 is smaller than the size of the first slot 31 in the length extension direction of the first belt 301 (see FIG. 12, the length direction of the first belt 301 is the longitudinal direction). However, it should be understood that the protection sheet 10 can be made of flexible materials, so the shape and size of the first slot 31 opened on the protection sheet 10 are flexible and variable. Therefore, the specific size limitations mentioned above are examples, and the first slot 31 can be set to allow the length adjustment device 400 to rotate 90° and pass through in the state shown in FIGS. 11 and 12 through any appropriate method in the art.

In the third embodiment, after the length adjustment device 400 passes through the first slot 31 and moves to the side of the protection sheet 10 facing the backrest 600, the second belt 300 wound around the length adjustment device 400 is removed from the length adjustment device 400. At this time, the protection sheet 10 can completely detach from the first belt 301 and the second belt 302.

The head protection device 100 of the third embodiment also includes a positioning belt 34, the positioning belt 34 serves to limit the excessive movement of the second belt 302 along the thickness extension direction of the second belt 302 (i.e. the thickness direction in FIG. 12).

In the third embodiment, the positioning belt 34 is attached to the side of the first part 10A facing away form the backrest 600, and is located on the side of the first slot 31 near the seat 500 (i.e. the side of the connecting buckle 900), and a gap 343 is formed between the positioning belt 34 and the first part 10A. More specifically, the positioning belt 34 includes two end parts 341 and a middle part 342. Two end parts 341 are respectively fixed to the first part 10A, for example, be sewn to the first part 10A. The middle part 342 is located between the two end parts 341, and the gap 343 is formed between the middle part 342 and the protection sheet 10. It should be understood that the so-called "gap" does not mean that the middle part 342 must be separated from the protection sheet 10, and the middle part 342 can basically adhere to the protection sheet 10. In some embodiments, the positioning belt 34 may be made of an elastic material, such as an elastic belt, to make the middle part 342 tend to adhere to the protection sheet 10.

In the third embodiment, the two end parts 341 of the positioning belt 34 can be opposite each other laterally or diagonally. In other embodiments, the positioning belt 34 can also be set in other forms, such as such as rectangles, trapezoids, etc., as long as the gap 343 can be provided.

In the third embodiment, the connecting part 302c of the second belt 302 passes through the gap 343 from the connecting end 302a and then passes through the length adjustment device 400, while the adjusting part 302d first passes through the length adjustment device 400 and then passes through the gap 343, thereby limiting the connecting part 302c and the adjusting part 302d between the positioning belt 34 and the first part 10A and overlapping each other, thereby limiting the excessive movement of the second belt 302 along the thickness extension direction of the second belt 302 (i.e. the thickness direction in FIG. 12). Due to the material of the positioning belt 34 being an elastic material, based on the overlap between the connecting part 302c and the adjusting part 302d in the gap 343, it is known that the elastic positioning belt 34 will apply elastic force to the overlap between the connecting part 302c and the adjusting part 302d, increasing the friction force between the connecting part 302c and the adjusting part 302d. Therefore, accidental sliding of the second belt 302 relative to the length adjustment device 400 can be avoided to prevent accidental adjustment of the length of the connecting part 302c and the length of the adjusting part 302d, so that the baby in the carrier 200 cannot be safely restrained by the second belt 302.

In the third embodiment, the length adjustment device 400 further includes an edge part 404, the edge part 404 is located on the side of the length adjustment device 400 near the seat 500 (i.e. the side of the connecting buckle 900) and adjacent to the second column 403, and the edge part 404 is located on the side of the positioning belt 34 facing away from the first part 10A, for abutting against the positioning belt 34 to further increase the friction force between the connecting part 302c and the adjusting part 302d.

The remaining structures of the third embodiment are the same as those of the first embodiment and will not be further described herein.

In summary, in various embodiments of the present application, when the user adjusts the position of the head protection device 100 on the shoulder belt 300, the length adjustment device 400 can synchronously slide with the sliding of the head protection device 100 on the shoulder belt 300.

Although preferred embodiments have been shown and described herein, it should be understood that these embodiments are only provided as examples. The person skilled in the art will think of many variants, changes, and replacements without deviating from the spirit of the present invention. Therefore, the accompanying claims aim to cover all such variations falling within the spirit and scope of the present invention.

What is claimed is:

1. A head protection device for wrapping a shoulder belt of a carrier and a length adjustment device of the carrier, wherein the shoulder belt is directly or indirectly connected to a backrest of the carrier and a seat of the carrier, and the shoulder belt is wound around the length adjustment device, the length adjustment device is slidable relative to the shoulder belt along a length extension direction of the shoulder belt, wherein the head protection device comprises:

a protection sheet, including a first part located between the length adjustment device and the backrest; and a limiting structure, which is arranged on the first part;

wherein the shoulder belt passes through the protection sheet twice in opposite directions at at least one position on the first part through the limiting structure, the protection sheet is slidable relative to the shoulder belt along the length extension direction of the shoulder belt, the length adjustment device is connected to the protection sheet through the shoulder belt, and a slide of the protection sheet drives the length adjustment device to synchronously slide with the protection sheet.

2. The head protection device according to claim 1, wherein the shoulder belt comprises a first belt comprising an upper connecting end connected to the backrest and a lower connecting end connected to the backrest at a position different from the position of the upper connecting end, the first belt passes through the protection sheet twice in opposite directions at at least two positions on the first part through the limiting structure, and the protection sheet is configured to slide relative to the first belt between the upper connecting end and the lower connecting end to adjust the position of the protection sheet on the first belt.

3. The head protection device according to claim 2, wherein the limiting structure comprises a first slot and a second slot set at an interval, the first belt passes through the protection sheet through the first slot and the second slot in opposite directions respectively, and the first slot and the second slot each has continuously extending periphery edges.

4. The head protection device according to claim 3, wherein the first belt comprises an upper part and a lower part each located between the upper connecting end and the lower connecting end, the upper part extends from a side of the first part facing the backrest through the first slot to a side of the first part facing away from the backrest, and extends from a side of the length adjustment device facing the first part through the length adjustment device to a side of the length adjustment device facing away from the first part, the lower part extends from the side of the length adjustment device facing away from the first part through the length adjustment device to the side of the length adjustment device facing the first part, and extends from the side of the first part facing away from the backrest through the second slot to the side of the first part facing the backrest.

5. The head protection device according to claim 3, wherein the first belt extends from a side of the first part facing the backrest through the first slot and the length adjustment device to a side of the length adjustment device facing away from the first part, then extends from the side of the length adjustment device facing away from the first part through the length adjustment device and the first slot back to the side of the first part facing the backrest, the length adjustment device is configured to synchronously slide with the slide of the protection sheet on the first belt, the first belt maintains a relative position between the length adjustment device and the protection sheet.

6. The head protection device according to claim 3, wherein in the length extension direction of the first belt, each of the first slot and the second slot is sized smaller than the length adjustment device, in a width extension direction of the first belt, each of the first slot and the second slot is sized greater than or equal to the first belt, and each of the first slot and the second slot is sized smaller than the length adjustment device.

7. The head protection device according to claim 3, wherein in the length extension direction of the first belt, each of the first slot and the second slot is sized smaller than the length adjustment device, a size of the length adjustment device in a thickness extension direction of the first belt is greater than a size of any one of the first slot and the second slot in the length extension direction of the first belt.

8. The head protection device according to claim 3, wherein a distance between the first slot and the second slot in the length extension direction of the first belt is smaller than a size of the length adjustment device.

9. The head protection device according to claim 2, wherein the first belt is wound around the length adjustment device, the length adjustment device is configured to synchronously slide with the protection sheet between the upper connecting end and the lower connecting end, and the first belt and limiting structure maintains a relative position between the length adjustment device and the protection sheet.

10. The head protection device according to claim 2, wherein the shoulder belt further includes a second belt, the second belt includes a connecting end and a free end, the connecting end is directly or indirectly connected to the seat, and the second belt is wound around the length adjustment device, the length adjustment device is configured to slide relative to the second belt between the connecting end and the free end, so as to adjust an extension length of the second belt between the connecting end and the length adjustment device.

11. The head protection device according to claim 10, wherein the second belt further comprises a connecting part and an adjusting part each located between the connecting end and the free end, the connecting part is connected from the connecting end to the length adjusting device, the adjusting part extends from the length adjustment device to the free end, and the length adjustment device is configured to slide along the second belt to distribute lengths of the adjusting part and the connecting part.

12. The head protection device according to claim 2, wherein the shoulder belt further includes a second belt comprising a connecting end and a free end, the connecting end is connected to the first part, and the second belt is wound around the length adjustment device and passes through a connecting buckle of the seat, the length adjustment device and the connecting buckle are configured to slide relative to the second belt between the connecting end and the free end to adjust an extension length of the second belt between the connecting end and the connecting buckle.

13. The head protection device according to claim 12, wherein the second belt further comprises a connecting part and an adjusting part each located between the connecting end and the free end, the connecting part extends from a side of the length adjustment device facing the first part through the length adjustment device to a side of the length adjustment device facing away from the first part, the adjusting part extends from the side of the length adjustment device facing away from the first part through the length adjustment device to the side of the length adjustment device facing the first part, and passes through the connecting buckle, and extends again from the side of the length adjustment device facing the first part through the length adjustment device to the side of the length adjustment device facing away from the first part, and then extends from the side of the length adjustment device facing away from the first part through the length adjustment device to the side of the length adjustment device facing the first part, the length adjustment device and the connecting buckle are configured to slide on the second belt to distribute lengths of the adjusting part and the connecting part.

14. The head protection device according to claim 1, wherein the shoulder belt comprises a first belt, the first belt comprises an upper connecting end connected to the backrest and a lower connecting end connected to the backrest at a position different from the position of the upper connecting end, the first belt passes through the protection sheet twice in opposite directions through the limiting structure at one position on the protection sheet and is wound around the length adjustment device, the length adjustment device is configured to synchronously slide with the slide of the protection sheet between the upper connecting end and the lower connecting end, the limiting structure is a first slot, and the first slot has continuously extending periphery edges.

15. The head protection device according to claim 14, wherein the shoulder belt further comprises a second belt wound around the length adjustment device, the second belt comprises a connecting part and an adjusting part, the head protection device further comprises a positioning belt, the positioning belt is arranged on a side of the first part facing away from the backrest, a gap is formed between the positioning belt and the first part, and both the connecting part and the adjusting part pass through the gap, and the connecting part and the adjusting part overlap with each other in the gap, the length adjustment device includes an edge part, the edge part is located on a side of the positioning belt facing away from the first part and abuts against the positioning belt.

16. The head protection device according to claim 15, wherein the second belt comprises a connecting end and a free end, the connecting part and the adjusting part are located between the connecting end and the free end, the connecting end is directly or indirectly connected to the seat, the length adjustment device slides relative to the second belt between the connecting end and the free end to adjust an extension length of the second belt between the connecting end and the length adjustment device.

17. The head protection device according to claim 14, wherein the first slot is sized smaller than the length adjustment device in the length extension direction of the first belt, the first slot is set to allow the length adjustment device to pass through after rotation.

18. The head protection device according to claim 14, wherein the first slot is sized smaller than the length adjustment device in the length extension direction of the first belt, the first slot is sized greater than the length adjustment device in a width extension direction of the first belt.

19. The head protection device according to claim 14, wherein the first slot is sized smaller than the length adjustment device in the length extension direction of the first belt, a size of the length adjustment device in a thickness extension direction of the first belt is smaller than a size of the first slot in the length extension direction of the first belt.

20. A carrier, wherein the carrier comprises:
a seat;
a backrest connected to the seat;
two shoulder belts connected between the seat and the backrest, each of the two shoulder belts being detachably directly or indirectly connected to the seat;
two length adjustment devices arranged on the two shoulder belts separately for adjusting lengths of the two shoulder belts; and
the head protection device according to claim 1, wrapping one of the two shoulder belts and one of the two length adjustment devices.

* * * * *